United States Patent
Ritter

(10) Patent No.: US 6,979,411 B1
(45) Date of Patent: Dec. 27, 2005

(54) WATER TREATMENT AGENT FOR EXTENDING WATER EXCHANGE INTERVALS IN TANK SYSTEMS

(75) Inventor: Günter Ritter, Bünde (DE)

(73) Assignee: Tetra Holding (US), Inc., Blacksburg, VA (US)

( * ) Notice: Subject to any disclaimer, the term of this patent is extended or adjusted under 35 U.S.C. 154(b) by 0 days.

(21) Appl. No.: 10/088,048

(22) PCT Filed: Aug. 16, 2000

(86) PCT No.: PCT/EP00/07981

§ 371 (c)(1), (2), (4) Date: Jun. 4, 2002

(87) PCT Pub. No.: WO01/21534

PCT Pub. Date: Mar. 29, 2001

(30) Foreign Application Priority Data

Sep. 18, 1999 (DE) .............. 199 44 800

(51) Int. Cl.⁷ .................. C01F 5/08; A01K 63/04
(52) U.S. Cl. .................. 252/180; 119/231; 426/805
(58) Field of Search .................. 252/180; 119/231; 426/805

(56) References Cited

U.S. PATENT DOCUMENTS

| | | | |
|---|---|---|---|
| 3,992,556 A | * | 11/1976 | Kovacs et al. ............... 426/72 |
| 5,118,513 A | * | 6/1992 | Mehansho et al. ............ 426/2 |
| 5,618,574 A | * | 4/1997 | Bunch ..................... 426/805 X |
| 6,299,928 B1 | * | 10/2001 | Takeuchi et al. ........ 426/805 X |
| 6,306,453 B1 | * | 10/2001 | Kurzinger .................. 426/658 |
| 6,376,229 B2 | * | 4/2002 | Morris et al. .............. 435/260 |
| 6,477,982 B1 | * | 11/2002 | Ritter ....................... 119/231 |

FOREIGN PATENT DOCUMENTS

| | | |
|---|---|---|
| CN | 1 115 620 | 1/1996 |
| DE | 296 17 181 | 2/1997 |
| DE | 195 33 994 | 3/1997 |
| DE | 197 04 953 | 8/1998 |
| GB | 1 415 453 | 11/1975 |
| GB | WO 97/34838 | 9/1997 |
| JP | 61-96959 | 5/1986 |
| WO | WO 96/26905 | 9/1996 |
| WO | WO 9708960 | * 3/1997 |
| WO | WO 97/34838 | * 9/1997 |

OTHER PUBLICATIONS

Leaflet supplied with the product "CENTRUM", a food supplemental marketed in Apr. 1997 in Germany by the Company Whitehall-Much.

* cited by examiner

Primary Examiner—Daniel S. Metzmaier
(74) Attorney, Agent, or Firm—Merchant & Gould

(57) ABSTRACT

A composition for long term improvement of water quality in biological tank systems is described as: 1) at least one highly or poorly soluble $Al^{3+}$, $Fe^{3+}$, $TiO^{2+}$ or $ZrO^{2+}$ salt of an organic carboxylic acid, optionally mixed with an organic carboxylic acid; 2) at least one water soluble N free biologically degradable organic compound; 3) at least one soluble alkali or alkaline earth metal salt of an organic carboxylic acid; and 4) at least one $Mg^{2+}$ salt of an organic carboxylic acid, optionally mixed with at least one $Ca^{2+}$ of an organic carboxylic acid; and also 5) trace elements and vitamins, particularly water soluble vitamins of the B series. Changes in water quality determining parameters can be reduced, minimized or eliminated by using the described agent and thus a significant reduction in partial water change frequency or a clear extension of periods without water changing can be achieved.

17 Claims, No Drawings

WATER TREATMENT AGENT FOR EXTENDING WATER EXCHANGE INTERVALS IN TANK SYSTEMS

This application is a 371 of PCT/EP00/07981 filed Aug. 16, 2000.

The invention concerns chemically- and microbiologically-acting compositions for the prolongation of the water exchange-free intervals in biological maintenance systems with use of ecologically neutral, chemically- and microbiologically-acting water additives.

In biological maintenance systems, e.g. aquaria, aquatic terrains and garden ponds, due to the daily feeding of the fish and other aquatic animals kept therein, it results in cumulative changes of important chemical water parameters and consequently in a continuous impairment of the water quality. From this follows a correspondingly reduced quality of life of the maintained fish and other aquatic animals.

If the starting water, e.g. tap water, possesses a sufficient quality, then, by frequent partial or complete change of water, an impairment of the water quality caused by the maintenance can be countered. The procedure of the water change is laborious and unpleasant for the aquarianists, for the maintained fish and other aquatic organisms not without, in part, considerable endangering due to undesired properties of the fresh starting water, for example chlorine or heavy metals.

Consequently, a minimising of the water change frequency and amount would be desirable when—as described in the present invention—it succeeds to suppress or to eliminate the impairment of the water quality.

In detail, in biological maintenance systems, it comes to the following changes of important water parameters impairing the water quality:

increase of the phosphate content, increase of the nitrate content, decrease of the carbonate hardness and of the pH value down to the point where the carbonate hardness is completely used up. The acute danger of the so-called acid fall the exists, i.e. the pH lowering goes far into the acid range. The result is a strongly increased fish mortality, consumption of important trace elements which are essential for the plant and bacterial metabolism, consumption of important water-soluble vitamins of the B group which are of importance for the whole ecosystem.

By means of a regular partial water change, the system-typical changes cannot be eliminated but only made smaller and only delay the impairment of the water quality. On the other hand, a regular partial water change involves still additional risks which, on the one hand, give rise to increased stress for fish and other aquatic organisms, on the other hand, are caused by the introduced fresh water. In the case of the very widely spread use of tap water, an endangering exists due to chlorine, heavy metals and the absence of organic colloids, whereby the tap water contains a certain mucous membrane aggressiveness.

Consequently, it is desirable to develop a water-preparing agent or process which reduces, minimises or eliminates the described changes of the water quality-determining parameters and thus makes possible a significant reduction of the partial water exchange frequency or a distinct prolongation of the water exchange-free intervals.

The above listed partial problems can, in part, be countered by already known measures.

A) The increase of the phosphate concentration mainly takes place by continuous introduction with the feed. The phosphate increase to values above 10–20 mg/l is disadvantageous since the undesired algal growth is promoted by phosphate.

The following measures are known for the phosphate reduction:

a) Binding of phosphate on $Al^{3+}$ and/or $Fe^{3+}$ oxide (hydroxide group-containing granulates) which are introduced into the filter system. Their limited capacity is disadvantageous. After their exhaustion, it is necessary to change the granulates, which is frequently very laborious. If the aquarianist does not regularly measure the phosphate content, he will not recognise the exhaustion of the material and the $PO_4^{3-}$ concentration in the maintenance water will again increase, i.e. the treatment success of this method is frequently only insufficient.

b) In the case of regular use, the addition of dissolved inorganic $Al^{3+}$ and/or $Fe^{3+}$ salts also leads to the lowering of the $PO_4^{3-}$ concentration. Disadvantages of this process are:

high fish toxicity of the dissolved inorganic $Al^{3+}$ and $Fe^{3+}$ salts, enrichment of the water with anions, such as e.g. chloride and sulphate, reduction of the carbonate hardness, of the $HCO_3^-$ and $CO_3^{2-}$ content and therewith reduction of the buffer capacity, lowering of the pH level and danger of the acid fall at KH=-0°dH, turbidity of the water and unpleasant flocculating out of $Al(OH)_3$ and $Fe(OH)_3$.

B) A further example for the mentioned undesired changes is the increase of the nitrate concentration due to continuous introduction of proteins and other nitrogen sources with the feed. All nitrogen sources resulting from the feed, to the greater part proteins, are oxidised microbially via ammonia and nitrite to nitrate. The continuous nitrate increase represents an unnatural loading of the maintenance water which is undesired for the aquarianist. The nitrate content of the starting water is frequently already so high, e.g. at 25–50 mg/l, so that the natural $NO_3^-$ concentration of a few mg/l is never achievable by water change.

The following measures are known for the lowering of the nitrate content:

a) Lowering of the nitrate content by anion exchangers mostly in chloride form. Disadvantageous is hereby the replacement of the nitrate ions by the loading anions of the exchanger, mostly chloride, and the replacement of sulphate and hydrogen carbonate ions. Besides the undesired lowering of the carbonate hardness, the chemical water composition is completely changed.

b) Denitrification in anaerobic medium or in anaerobic reactors. By introduction of practically insoluble organic nitrogen-free material in granulate form in the filter system, anaerobic regions are provided by strong $O_2$ provisions, in which nitrate is reduced as oxygen source to $N_2$. Disadvantageous is:

the uncertain dosing, the uncertain process control and process controllability, the sulphate reduction to highly toxic hydrogen sulphide to be expected in the case of small $NO_3^-$ concentrations.

C) The nitrification-caused lowering of the carbonate hardness forms a further example for the mentioned undesired water changes. The oxidation of the continuously supplied organic nitrogen proceeds via the oxidation of ammonia to nitrite made possible by nitrifying bacteria. In the case of this biological process, one mol $H^+$ ions result per mol ammonia. The liberated $H^+$ ions react with bases present, mostly hydrogen carbonate as binder of the carbonate hardnes with protonisation and reduction of the carbonate hardness.

For the compensation of the carbonate hardness losses (or $HCO^{3-}$ losses) but also for the increasing of the carbonate hardness, the following measures are known:
  a) Addition of $NaHCO_3$ and/or $Na_2CO_3$ as powder or as solution. The process functions dependably but suffers from the following disadvantages:
      In the case of $NaHCO_3/Na_2CO_3$ mixtures, it comes to rapid pH increases in the maintenance water which lead to considerable stress of the organism.
      In waters with increased ammonium contents, parallel to the pH increase, inter alia a lethal amount of ammonia is liberated.
      The water solubility of $NaHCO_3$ is relatively low so that highly concentrated products with convenient use are not possible.
  b) Addition of freshly prepared solutions which, besides dissolved calcium hydrogen carbonate, also contain must-free $CO_2$. The excess $CO_2$ can lead to a rapid $CO_2$ damaging of the organism. Besides the $HCO_3^-$ concentration, the $Ca^{2+}$ concentration is here also increased, which is not always desired.

Furthermore, chemically- and biologically-caused losses of dissolved calcium hydrogen carbonate can bring about undesired water changes. By means of $CO_2$ consumption and the pH increase involved therewith, the lime/carbonic acid equilibrium is displaced in the direction of lime deposition. The disadvantageous loss of dissolved $Ca(HCO_3)_2$ leads to a corresponding lowering of the calcium concentration and of the $HCO_3^-$ concentration (carbonate hardness lowering).

For the compensation of the losses of $Ca(HCO_3)_2$ or of its increasing, the following measures are known:
  a) Addition of solutions which, besides $Ca(HCO_3)_2$ also contain much free $CO_2$. This measure suffers from the above-described disadvantages. A further disadvantage lies in the laboriousness of the process since the $Ca(HCO_3)_2$ solutions must be laboriously prepared by dissolving of $CaCO_3$ or $Ca(OH)_2$ in $CO_2$—enriched water. By addition of $Mg(OH)_2$ or $MgCO_3.Mg(OH)_2$, a solution can also be prepared which additionally contains $Mg(HCO_3)_2$.
  b) Addition of solid mixtures which contain equivalent amounts of $NaHCO_3$ and soluble Ca, Mg salts (mostly chlorides). By dissolving of this mixture in maintenance water, the ions $Ca^{2+}+2\ Cl^-+2Na^++2\ HCO_3^-$ are introduced. Besides the desired $[Ca^{2+}+2\ HCO_3^{-1}]$, the water now also contains the equivalent amount of NaCl (or also $Na_2SO_4$), which is undesired. The disadvantage of this process consists in the introduction of foreign salts, e.g. NaCl or $Na_2SO_4$.

Finally, a consumption of dissolved carbon dioxide also changes the water quality.

Algae, water plants and autotrophic micro-organisms continuously consume dissolved carbon dioxide. Besides the thereby increased pH value, a $CO_2$ deficiency situation results which acts disadvantageously on chemical and biological processes.

For the compensation of the $CO_2$ deficiency, the following $CO_2$ addition measures are known:
  a) Introduction of $CO_2$ gas from $CO_2$ pressure bottles. Problematical in the case of this method are:
      the difficultly adjustable and controllable dosing,
      the price,
      safety risks which are involved with the pressure gas system.
  b) $CO_2$ production by anodic oxidation of a graphite electrode. The system contains the following disadvantages:
      poor dosability,
      $CO_2$ peaks due to secondary chemical processes on the cathode, combined with a strong decalcification,
      resulting of oxyhydrogen,
      formation of chlorine in chloride-enriched waters.
  c) Production of $CO_2$ in external fermentation reactors. Here, too, serious, system-caused disadvantages exist, e.g.
      strong temperature dependency of the fermentation process,
      difficultly controllable process,
      very poor dosing possibility and dosing constancy.

The various above-describid problems initially appear to be heterogenous and not solvable with one principle.

Surprisingly, it was found that the improvement of the water quality of biological maintenance systems is achievable by agents by means of which are added to the maintenance system singly or in any desired combination the following components:
  a) for the lowering of the phosphate concentration, at least one easily or sparingly soluble $Al^{3+}$, $Fe^{3+}$, $TiO^{2+}$, $ZrO^{2+}$ or $Ca^{2+}$ salt of an organic carboxylic acid possibly in admixture with an organic carboxylic acid;
  b) for the lowering of the nitrate concentration or limitation of the nitrate increase, at least one water-soluble, N-free, biologically decomposable organic compound;
  c) for the increasing of the carbonate hardness or of the $HCO_3^-$ concentration, at least one alkali metal or alkaline earth metal salt of an organic carboxylic acid;
  d) for the increasing of the total hardness or of the concentration of $Ca^{2+}$ and $Mg^{2+}$ hydrogen carbonate, a mixture of at least one $Ca^{2+}$ and $Mg^{2+}$ salt of an organic carboxylic acid, and
  e) for the increasing of the $CO_2$ concentration, at least one biologically decomposable compound.

Products which, in the form of water additions, stably lessen or solve the above-described problems in toto and without side effects over a long time are hitherto not known.

Now, the task forming the, basis of the invention is to develop a water additive which, from a general point of view
  reduces, minimises or eliminates the described changes of quality-determining water parameters,
  considerably prolongs the partial water exchange-free intervals from hitherto 1 to 4 weeks, e.g. to 6 months, and
  thereby makes the aquarium hobby safer, simpler and more attractive.

In particular, in the case of regular use, the water additive should reduce or minimise or eliminate the following chemical changes:
  the phosphate increase,
  the nitrate increase,
  the carbonate hardness loss and the pH lowering,
  the acid fall,
  the consumption of essential trace elements,
  the consumption of water-soluble vitamins of the B group.

Thus, the subject of the invention is a composition for the long-term improvement of the water quality of biological maintenance systems characterised by a content of
1. at least one easily or sparingly soluble $Al^{3+}$, $Fe^{3+}$, $TiO^{2+}$ or $ZrO^{2+}$ salt of an organic carboxylic acid, possibly in admixture with an organic carboxylic acid;
2) at least one water-soluble, N-free, biologically decomposable organic compound;
3) at least one soluble alkali metal or alkaline earth metal salt of an organic carboxylic acid; and
4) at least one $Mg^{2+}$ salt of an organic carboxylic acid, possibly in admixture with at least one $Ca^{2+}$ salt of an organic carboxylic acid, as well as
5) trace elements and vitamins, especially water-soluble vitamins of the B series.

Surprisingly, it was possible to combine the above-mentioned individual components to a single active material combination for a more comprehensive chemical/microbiological water processing.

In addition to the components necessary for the removal of the initially described partial problems, the resulting composition can also contain all essential trace elements and water-soluble vitamins, especially those of the B group.

The use of only a single water treatment agent in the form of a combination product is, for the aquarianist, considerably more pleasant, simpler and safer than various uses of individual problem solvers.

The new composition (in the form of a combination preparation) for the combined problem solving contains the following individual components:

A) Components for the prevention of the phosphate increase or for the reduction of the phosphate concentration:

This function is fulfilled by easily or sparingly soluble $Al^{3+}$, $Fe^{3+}$, $TiO^{2+}$ or $ZrO^{2+}$ salts of organic carboxylic acids, e.g. their acetates, formates, tartrates and especially citrates. Besides the strongly phosphate binding metal ions $Al^{3+}$, $Fe^{3+}$, $TiO^{2+}$ or $ZrO^{2+}$, calcium salts of organic carboxylic acids can also be used in similar manner, however with considerably smaller phosphate elimination ability. Mixtures of the salts of organic acids with the basic organic acids or other organic acids are also usable with the same success, e.g.
aluminium citrate plus citric acid,
iron (III) citrate plus citric acid,
iron (III) citrate plus tartaric acid.

The principle is illustrated in the following for $Al^{3+}$ and $Fe^{3+}$ salts but applies correspondingly for $TiO^{2+}$ and $ZrO^{2+}$ salts. If $Al^{3+}$ and/or $Fe^{3+}$ salts of carboxylic acids are added to the maintenance water, then initially no flocculation and turbidity is observed. Only in the case of the aerobic biological breakdown in the filter system according to

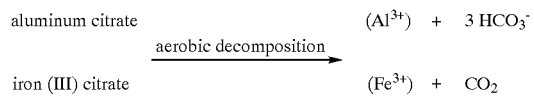

In the case of directly following formation of $Al(OH)_3$ or $Fe(OH)_3$ according to

is phosphate added and precipitated out together with the hydroxides.

The precipitated metal hydroxides with co-flocculated phosphate collect in the filter sludge and are eliminated in the case of the regular filter cleaning.

By means of regular addition of organic metal salts, e.g. as aqueous solution, to the maintenance water, the phosphate increase can be completely prevented.

In contradistinction to the phosphate precipitation with inorganic $Al^{3+}$ or $Fe^{3+}$ salts, the phosphate precipitation according to the invention contains serious and surprising advantages:
no turbidity and flock formation results in the water,
the process takes place substantially in the biologically active filter system,
the organic metal salts behave toxicologically neutral, ecologically neutral, carbonate hardness neutral,
no enriching foreign ions are added,
by aerobic breakdown of the carboxylic acid anions, only $CO_2$ is produced which positively influences the $CO_2$ content or, in part compensates the $CO_2$ consumption.

The adjusted phosphate concentrations are typical for each metal:
for Fe citrate: about 0.0–0.2 mg/l
for Al citrate: about 0.0–0.5 mg/l
for Ca citrate: about 0.5–1.5 mg/l.

Aluminium citrate and/or iron citrate are preferably used. The concentration of use in the maintenance water amounts to 0.5–50 mg/l, preferably 0.5–10 mg/l, in the case of a dosing of one to three times per week.

B) Components for the prevention or limiting of the nitrate increase:

If to the maintenance water are regularly added N-free, organic, decomposable substances, also without the presence of anaerobic reactors, the increase of the nitrate concentration is slowed down or limited and a nitrate concentration is achieved which levels out at an average level. Without treatment with these water additives according to the invention, the nitrate content increases monotonously and unlimitedly. Since the reason for the limited or braked nitrate increase lies in a partial denitrification in anaerobic micro-regions in the filter, parallel to the slowing down or limitation of the nitrate increase, the nitrification-caused loss of carbonate hardness ($HCO_3^-$ concentration) is also inhibited or limited.

As nitrate-reducing, water-soluble compounds; there can, in principle, be used all biologically decomposable organic compounds but preferably aliphatic compounds, such as for example alcohols, e.g. glycerol, sorbitol or ethanol, sugars, e.g. pentoses, hexoses or saccharose, or carboxylic acids, e.g. acetic acid, citric acid, lactic acid or tartaric acid. Combinations of, in each case, the same amount parts of citric acid and saccharose or acetic acid and saccharose have also proved to be useful.

Acetic acid, tartaric acid, citric acid, glycerol, glucose, saccharose are preferably used, whereby a combination of citric acid, tartaric acid and saccharose has proved to be especially good.

The concentrations of use in maintenance water amounts to for citric acid 0.5–100 mg/l, preferably 1–20 mg/l; for saccharose to 0.5–50 mg/l, preferably 1–20 mg/l, and for tartaric acid to 0.5–50 mg/l, preferably 1–20 mg/l, in the case of a dosing of one to three times per week.

Parallel to the $NO_3^-$ stabilising, there is also achieved a stabilising of the carbonate hardness at minimum values, below which the carbonate hardness does not sink further.

The added compounds are completely broken down to $H_2O$ and $CO_2$. The $CO_2$ formed is used as C-sources by plants, algae and nitrifying bacteria.

By introduction of an aeration, the $CO_2$-concentration can, according to need, be corrected downwardly.

C) Components for the compensation of the losses of carbonate hardness or hydrogen carbonate:

In the case of the present solution according to the invention, one uses the following microbiological/chemical principle with use of $Na^+$, $Ca^{2+}$, $Mg^{2+}$ and $Sr^{2+}$ salts of aliphatic carboxylic acids, such as e.g. acetic acid, lactic acid, citric acid, tartaric acid, formic acid, propionic acid, malic acid and the like.

If carboxylic acids, e.g. acetic acid, are broken down microbiologically, there results only $H_2O$ and $CO_2$:

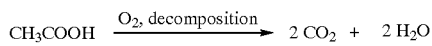

$$CH_3COOH \xrightarrow{O_2, \text{decomposition}} 2\,CO_2 + 2\,H_2O$$

If, on the other hand, one subjects salts of the carboxylic acids to the microbiological decomposition, then, besides $CO_2$, corresponding to the number of the introduced negative charges of the anions, hydrogen carbonate is also formed.

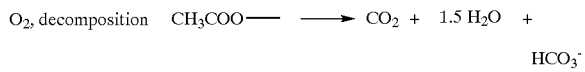

$$O_2, \text{decomposition} \quad CH_3COO^- \longrightarrow CO_2 + 1.5\,H_2O + HCO_3^-$$

By the introduction of salts of carboxylic acids into the maintenance water, after biological decomposition the hydrogen carbonates are formed.

On the example for sodium hydrogen carbonate from organic sodium salts, e.g. Na acetate, Na citrate, may not act very spectacularly since $NaHCO_3$ itself is very easily accessible. However, even here, in the case of liquid compositions, there exists the great advantage of the mostly—in comparison with $NaHCO_3$ very high solubility, for example of Na acetate, which permits the high product concentrations and ranges.

A further advantage of the use of organic Na salts instead of $NaHCO_3$ or $Na_2CO_3$ consists in the pH neutral use;

The Na salt of organic carboxylic acids acts pH neutral, can with excess carboxylic acid(s) even adjust acidicly in the product. This is, of course, not possible with $NaHCO_3$ or $Na_2CO_3$.

In the case of the biological breakdown, there still results (except in the case of formates) $CO_2$ which also counters a pH increase.

Even better recognisable are the advantages of the problem solution according to the invention when one considers the introduction of the hydrogen carbonates of the alkaline earth metals $Mg^{2+}$, $Ca^{2+}$, $Sr^{2+}$ which, as known, are not available as substances. By addition of the soluble $Mg^{2+}$, $Ca^{2+}$, $Sr^{2+}$ salts of organic carboxyli acids, in the maintenance water there can be built up without problem the desired concentrations of the hydrocarbonates.

EXAMPLE

Acetate

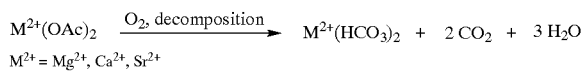

$$M^{2+}(OAc)_2 \xrightarrow{O_2, \text{decomposition}} M^{2+}(HCO_3)_2 + 2\,CO_2 + 3\,H_2O$$

$M^{2+} = Mg^{2+}, Ca^{2+}, Sr^{2+}$

The dosing is orientated to the desired adjustment or increasing of the carbonate hardness or of the $HCO_3^-$ concentration. 1 mMol/l Na salt of organic carboxylic acids increases the carbonate hardness by 2.8° dH, 1 mMol/l $Mg^{2+}$, $Ca^{2+}$, $Sr^{2+}$ salts of organic carboxylic acids increases the carbonate hardness by 5.6° dH.

As carboxylic acid, there can be used:

a) for Na+salts:
practically all aliphatic carboxylic acids, especially acetic acid, lactic acid, citric acid, tartaric acid and the like.

b) for $Mg^{2+}$ salts:
practically all aliphatic carboxylic acids, especially acetic acid, lactic acid, citric acid, tartaric acid and the like.

c) for $Ca^{2+}$ salts:
all aliphatic carboxylic acids which form water-soluble $Ca^{2+}$ salts, especially formic acid, acetic acid, propionic acid, lactic acid, malic acid and the like.

d) for $Sr^{2+}$ salts:
all aliphatic carboxylic acids which form water-soluble $Sr^{2+}$ salts, especially formic acid, acetic acid, propionic acid, lactic acid, malic acid and the like.

$Na^+$ and $Mg^{2+}$ salts of citric acid and tartaric acid are preferably used. Because of the normally high $Ca^{2+}$ content of the starting water, $Ca^{2+}$ salts can be omitted; an admixing is, however, generally possible if acids are used which form soluble Ca salts.

The carbonate hardness added to the maintenance water expediently one to three times a week amounts to 0.05–5° dH, preferably 0.1–1.0° dH. This is achieved by the corresponding addition of 0.018–1.8 mMol/l alkali metal salts, preferably 0.036–0.36 mMol/l or 0.009–0.9 mMol/l alkaline earth metal salts, preferably 0.018–0.18 mmol, or corresponding mixtures of alkali metal and alkaline earth metal salts.

D) Components for the increasing of the total hardness:

With the supplying of $Mg^{2+}$ salts (and $Ca^{2+}$ salts) of organic carboxylic acids for the increasing of the carbonate hardness as described under C) is automatically bound an increasing of the total hardness. The advantages are:

very simple and sure, defined adjustment and increasing of the total hardness, problem-free preparation and use of product compositions, especially liquid solutions, no introduction of undesired foreign ions, easy adjustment of all desired Mg:Ca ratios from ∞:1 to 1:∞, only controlled amounts of $CO_2$ are produced, which serve plants, algae and autotrophic micro-organisms for the C-supplying, besides the here-described $Mg^{2+}$ and $Ca^{2+}$ hydrogen carbonates formed from organic salts, there can also be added other inorganic $Mg^{2+}$, $Ca^{2+}$ salts, such as e.g. chlorides and sulphates, so that every possible or required chemical composition of the total hardness can be realised.

$Mg^{2+}$ salts (if required, also $Ca^{2+}$ salts) of citric acid and tartaric acid are preferably used.

The total hardness added to the maintenance water one to three times a week as magnesium hardness amounts to 0.01–2° dH, preferably 0.01–1° dH, which corresponds to 0.0018–0.36 mMol/l, preferably 0.018–0.18 mMol/l magnesium salt.

E) Components for the increasing of the $CO_2$ concentration:

In the case of the definition of the above components A) to D), it has already been described that, in the case of the biological decomposition of organic compounds in the maintenance system, $CO_2$ is formed. This can be built up to an internal, microbiologically-working $CO_2$ supply system. A continuous and sufficient but not yet organism-damaging supply of $CO_2$ to the maintenance water fulfils various important functions:

carbon fertilising of plant organisms,
carbon supplying of the autotrophic micro-organisms, especially the nitrificants,
prevention of the pH increase caused by $CO_2$ consumption,
adjustment of a definite pH value by adjustment of the $HCO_3^-/CO_2$ acid-base equilibrium,
intervention into the lime/$CO_2$ equilibrium and prevention of the chemical and biological lime precipitation.

It has been shown that $CO_2$ concentrations between 1 and 25 mg/l, preferably 5–15 mg/l, lie in the optimum range. Potential $CO_2$ damagings of fish and other water organisms do not here occur. Since $CO_2$ is continuously used up in the maintenance system and losses occur into the atmosphere, $CO_2$ must be dosed in the correct amounts to the maintenance water. This can be achieved very easily by a dosing to be carried out one to three times a week of biologically decomposable organic carboxylic acids, alcohols and sugars. The following compounds have proved to be especially useful:

a) carboxylic acids: formic acid, oxalic acid, acetic acid, lactic acid, citric acid, malic acid, tartaric acid,
b) alcohols: ethanol, glycerol, sorbitol,
c) sugars: pentoses, hexoses, saccharose.

If one doses the carboxylic acids alone, then, in a chemical reaction, from the hydrogen carbonate supply there is immediately liberated the equivalent amoun of $CO_2$:

$$HCO_3^- + CH_3COOH \longrightarrow CO_2 + H_2O + CH_3COO^-$$

In the case of the subsequent biological breakdown of the carboxylic acid anion, the consumed hydrogen carbonate is again slowly produced (within a few hours to 24 hours) and further $CO_2$ formed:

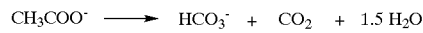

$$CH_3COO^- \longrightarrow HCO_3^- + CO_2 + 1.5 H_2O$$

Consequently, carboxylic acids produce $CO_2$ in a stepped process:

a) in a secondary reaction by protonisation of $HCO_3^-$,
b) in a reaction lasting a few hours up to 24 hours by oxidative biological breakdown.

Alcohols and sugars added to the maintenance system are subsequently broken down to $H_2O$ and $CO_2$ by the relatively slow microbiological reaction.

By choice of combinations of different C-sources with differing rate of $CO_2$ liberation, there can be achieved a very uniform $CO_2$ introduction, e.g. by the combination of citric acid and saccharose or acetic acid and saccharose.

The maximum formed $CO_2$ concentration in the maintenance water (after complete breakdown of the organic additives) amounts to 1–100 mg/l, preferably 5–50 mg/l in the case of a dosing of one to three times per week.

By means of biological consumption by plant organisms and autotrophic bacteria, as well as by a continuous weak aeration, the $CO_2$ concentration maxima are quickly levelled off.

F) Components for the increasing of the concentration or compensation of the continuous losses of essential trace elements:

In the following Table 1 are listed the general and preferred concentration ranges of the trace element used.

In order to avoid an accumulation of non-decomposable complex formers, all metallic complex-forming trace elements are added to the maintenance water in the form of citrates, tartrates and the like.

TABLE 1

| | concentration in the maintenance water | | |
|---|---|---|---|
| trace element | total concentration | preferred concentration range | complex-bound |
| iron | 1–100 µg/l | 2–20 µg/l | yes |
| boric acid | 0.5–50 µg/l | 0.5–10 µg/l | no |
| bromide | 0.1–100 µg/l | 0.1–5 µg/l | no |
| iodide | 0.01–100 µg/l | 0.1–10 µg/l | no |
| lithium | 1–200 ng/l | 5–100 ng/l | no |
| tin | 1–200 ng/l | 5–100 ng/l | yes |
| manganese | 0.1–100 µg/l | 0.2–20 µg/l | yes |
| zinc | 0.1–100 µg/l | 0.1–10 µg/l | yes |
| nickel | 0.01–20 µg/l | 0.05–5 µg/l | yes |
| copper | 0.01–20 µg/l | 0.05–5 µg/l | yes |
| vanadium | 1–500 ng/l | 5–100 ng/l | yes |
| molybdenum | 1–500 ng/l | 5–100 ng/l | no |
| cobalt | 0.1–50 ng/l | 0.5–20 ng/l | yes |

The trace elements are dosed with the combination agent according to the invention to the maintenance water one to three times a week.

G) Components for the increasing of the concentration or compensation of the continuous consumption of the water-soluble vitamins of the B group:

In the following Table 2 are listed the general and preferred concentration ranges of the water-soluble vitamins of the B group introduced into the maintenance water:

TABLE 2

| | concentration in the maintenance water | |
|---|---|---|
| vitamin | total concentration | preferred concentration range |
| B1 | 0.1–100 µg/l | 0.1–50 µg/l |
| B2 | 0.05–50 µg/l | 0.05–10 µg/l |
| B6 | 0.01–30 µg/l | 0.05–10 µg/l |
| B12 | 0.05–50 ng/l | 0.05–10 ng/l |
| nicotinic acid amide | 0.1–50 µg/l | 0.1–20 µg/l |
| panthenol | 0.1–100 µg/l | 0.1–10 µg/l |
| biotin | 0.01–10 µg/l | 0.01–1 µg/l |

The vitamins are dosed with the active material combination one to three times per week.

The following embodimental example is to explain the invention in more detail.

EMBODIMENTAL EXAMPLE

To completely set up, planted, filtered and weakly aerated warm water aquaria (70 l contents occupied by 10–20 average sized tropical fish) were added once a week the above-described components for the prolongation of the water change interval in the form of a combination agent.

In the case of a dosing of 1 ml of solution of the composition per 4 liters of aquarium water, the active material concentration set out in the following Table 3 were achieved:

TABLE 3

| component | concentration in the maintenance water | added hardness |
|---|---|---|
| citric acid | 11.0 mg/l | |
| tartaric acid | 3.5 mg/l | |
| saccharose | 5.0 mg/l | |
| iron citrate | 2.5 mg/l | |
| $NaHCO_3$ | — | 0.3° dH |
| $Mg(HCO_3)_2$ total hardness | — | 0.1° dH |
| carbonate hardness | — | 0.4° dH |
| $Fe^{3+}$ | 13.0 μg/l | |
| $H_3BO_3$ | 6.0 μg/l | |
| $Br^-$ | 1.0 μg/l | |
| $I^-$ | 1.0 μg/l | |
| $Li^+$ | 50.0 ng/l | |
| $Sn^{2+}$ | 50.0 ng/l | |
| $Mn^{2+}$ | 3.0 μg/l | |
| $Zn^{2+}$ | 1.5 μg/l | |
| $Ni^{2+}$ | 0.3 μg/l | |
| $Cu^{2+}$ | 0.3 μg/l | |
| V | 50.0 ng/l | |
| Mo | 50.0 ng/l | |
| Co | 8.0 ng/l | |
| B1 | 10.0 μg/l | |
| B2 | 0.6 μg/l | |
| B6 | 0.3 μg/l | |
| B12 | 0.7 ng/l | |
| nicotinic acid amide | 3.0 μg/l | |
| panthenol | 1.3 μg/l | |
| biotin | 0.1 μg/l | |

The aquaria were maintained for 6 months without water change. Evaporated water was supplemented by demineralised water in order to provide a worst-case situation with regard to KH (carbonate hardness) losses, pH fall.

During the whole experimental time, the following parameters of the maintenance water were monitored:

1. Phosphate concentration:
   In the whole experimental period, the phosphate concentration remained below 0.1–0.2 mg/l.
2. Nitrate concentration:
   Even with very low weekly supply of nitrate-lowering components (citric acid, saccharose, tartaric acid), the $NO_3$ content increased up to about 100–140 mg/l and then remained constant. By doubling of the nitrate-lowering components, the nitrate maximum would be held at 50–70 mg/l and in the case of a dosing of this amount every 2 days, the $NO_3$ content would not increase considerably over the initial concentration of about 15–20 mg/l.
3. Carbonate hardness content, pH value:
   The weekly introduced amount of carbonate hardness (together 0.4° dH) was sufficient for the compensation of the KH losses. The acid fall could therewith be dependably hindered, the pH value was stabilised in the range of pH 7.3–8.0.
4. Introduction of $CO_2$:
   The weekly dosing in of decomposable organic compounds (citric acid, tartaric acid, saccharose, iron citrate, sodium citrate, magnesium citrate) provided for the liberation of sufficient $CO_2$ in order to cover the weekly $CO_2$ requirement of the aquarium in sufficient measure.
   The $CO_2$ concentration thereby remained between 2.5 and 25 mg/l $CO_2$.
5. Supplementing of the trace elements:
   The weekly dosing in of the trace elements set out in Table 1 (Fe to Co) continuously compensated for the losses due to trace element consumption or elimination, recognisable by the very good plant growth and vital healthy fish. The fish losses were nil.
6. Supplementing of the water-soluble vitamins:
   The B-vitamins set out in Table 2 (B1 to biotin) were added weekly to the aquarium water in the stated concentration of use.
7. General biological assessment of the test aquaria 7 months without water change:
   The aquaria treated once a week with the composition according to the invention showed, in comparison with the untreated control aquaria
   a lower fish mortality (in the whole time period, no fish died),
   a clearly improved growth and appearance of the water plants,
   less algal growth.

The status of the aquaria was so favourable that even a still further extended elongation of the water exchange-free period appeared possible, for example 9 to 12 months.

Composition, preparation, form of administration of the combination product or preparation according to the invention:

The exact composition of the combination product or preparation is derived from
  the active material concentrations to be introduced into the maintenance water (e.g. the concentrations set out in Table 3 for the weekly dosing and the raw materials or active material precursors derived therefrom);
  the amount of water to be prepared or to be stabilised (e.g. 1 packing for 100–1000 l of aquarium water);
  the dosing frequency, e.g. daily
  daily
  every 2 days
  2×per week is preferred.

The combination agents according to the invention can be made available in the form of concentrates, aqueous solutions or solid compositions, such as e.g. powders, granulates, extrudates, tablets, pearls or in capsules.

Besides the pure active materials or active material precursors, the compositions can contain further components corresponding to the prior art, for example preserving agents, thickeners, 1×week, 1×per 2 weeks suspension stabilisers for liquid compositions, colouring materials, technological adjuvants for the granulation, tabletting or extruding, flow improvers in the case of powders.

What is claimed is:

1. A method of improving the water quality of biological maintenance systems for the long term, comprising adding a water treatment composition to the systems, said composition comprising:
   a) at least one easily or sparingly soluble $Al^{3+}$, $Fe^{3+}$, $TiO^{2+}$ or $ZrO^{2+}$ salt of an organic carboxylic acid;
   b) at least one water-soluble N-free, biologically decomposable organic compound;
   c) at least one soluble alkali metal salt of an organic carboxylic acid and d) a $Ca^{2+}$ or $Mg^{2+}$ salt or a mixture of $Ca^{2+}$ and $Mg^{2+}$ salts of an organic carboxylic acid; and e) trace elements and vitamins.

2. The method according to claim 1 comprising:

a) an a salt selected from the group consisting of an acetate, formate, tartrate, citrate, and a mixture thereof;

b) at least one carboxylic acid, an alcohol, a sugar, or a mixture thereof;

c) an alkali metal salt of citric, acetic, lactic, tartaric, formic or malic acid;

d) a $Ca^{2+}$ or $Mg^{2+}$ salt or a mixture of $Ca^{2+}$ and $Mg^{2+}$ salts of organic carboxylic acids; and e) trace elements and vitamins.

3. The method according to claim 1, wherein component a) further comprises an organic carboxylic acid.

4. The method according to claim 1, wherein component e) are water-soluble vitamins of the B series.

5. The method according to claim 1, wherein component a) comprises aluminum citrate, iron citrate or a mixture thereof.

6. The method according to claim 1, wherein component b) comprises acetic, citric, tartaric, lactic acid, glycerol, sorbitol, ethanol, a pentose, a hexose, a saccharose, or a mixture thereof.

7. The method according to claim 6 wherein component b) is a combination of citric acid, tartaric acid and saccharose.

8. The method according to claim 1, wherein component c) is a sodium salt of citric or tartaric acid, or a mixture thereof.

9. The method according to claim 1, wherein component d) comprises magnesium citrate or tartrate, or a mixture thereof.

10. The method according to claim 9, further comprising calcium citrate or tartrate, or a mixture thereof.

11. The method according to claim 1 wherein the trace elements are selected from the group consisting of iron, boric acid, bromide, iodide, lithium, tin, manganese, zinc, nickel, copper, vanadium, molybdenum, cobalt, and a mixture thereof.

12. The method according to claim 1, wherein the vitamins are selected from the group consisting of vitamin B1, B2, B6, B12, nicotinic acid amide, panthenol, biotin and a mixture thereof.

13. A water treatment composition for the long term improvement of the water quality of biological maintenance systems, comprising the following, based on the concentration in the maintenance system:

a) 0.5–50 mg of at least one easily or sparingly soluble $Al^{3+}$, $Fe^{3+}$, $TiO^{2+}$ or $ZrO^{2+}$ salt of an organic carboxylic acid;

b) 0.5–100 mg of one or more organic compounds selected from citric acid, saccharose, tartaric acid, and a mixture thereof;

c) 0.018–1.8 mmol of an alkali metal salt;

d) 0.0018–0.36 mmol of magnesium salt of an organic carboxylic acid; and e) 1–100 $\mu$g iron;
0.5–50 $\mu$g boric acid;
0.1–100 $\mu$g bromide;
0.01–100 $\mu$g iodide;
1–200 ng lithium;
1–200 ng tin;
0.1–100 $\mu$g manganese;
0.1–100 $\mu$g zinc;
0.01–20 $\mu$g nickel;
0.01–20 $\mu$g copper;
1–500 ng vanadium;
1–500 ng molybdenum;
0.1–50 ng cobalt;
0.1–100 $\mu$g vitamin B1;
0.05–50 $\mu$g vitamin B2;
0.01–30 $\mu$g vitamin B6;
0.05–50 ng vitamin B12;
0.1–50 $\mu$g nicotinic acid amide;
0.1–100 $\mu$g panthenol; and
0.01–10 $\mu$g biotin.

14. A water treatment composition for the long term improvement of the water quality of biological maintenance systems, comprising the following, based on the concentration in the maintenance system:

a) 0.5–10 mg of at least one easily or sparingly soluble $Al^{3+}$, $Fe^{3+}$, $TiO^{2+}$ or $ZrO^{2+}$ salt of an organic carboxylic acid;

b) 0.5–50 mg of one or more organic compounds selected from citric acid, saccharose, tartaric acid, and a mixture thereof;

c) 0.036–0.36 mmol of an alkali metal salt;

d) 0.018–0.18 mmol of magnesium salt of an organic carboxylic acid; and e) 2–20 $\mu$g iron;
0.5–10 $\mu$g boric acid;
0.1–5 $\mu$g bromide;
0.1–10 $\mu$g iodide;
5–100 ng lithium;
5–100 ng tin;
0.2–20 $\mu$g manganese;
0.1–10 $\mu$g zinc;
0.05–5 $\mu$g nickel;
0.05–5 $\mu$g copper;
5–100 ng vanadium;
5–100 ng molybdenum;
0.5–20 ng cobalt;
0.1–50 $\mu$g vitamin B1;
0.05–10 $\mu$g vitamin B2;
0.05–10 $\mu$g vitamin B6;
0.1–10 ng vitamin B12;
0.1–20 $\mu$g nicotinic acid amide;
0.1–10 $\mu$g panthenol; and
0.01–1 $\mu$g biotin.

15. A water treatment composition for the long-term improvement of the water quality of biological maintenance systems, comprising:

a) at least one easily or sparingly soluble $Al^{3+}$, $Fe^{3+}$, $TiO^{2+}$ or $ZrO^{2+}$ salt of an organic carboxylic acid;

b) a combination of citric acid, tartaric acid and saccharose;

c) at least one soluble alkali metal salt;

d) magnesium citrate or tartrate, or a mixture thereof, and e) trace elements and vitamins.

16. A water treatment composition for the long term improvement of the water quality of biological maintenance systems, comprising the following, based on the concentration in the maintenance system:

a) 0.5–50 mg of at least one easily or sparingly soluble $Al^{3+}$, $Fe^{3+}$, $TiO^{2+}$ or $ZrO^{2+}$ salt of an organic carboxylic acid;

b) 0.5–100 mg of one or more organic compounds selected from citric acid, saccharose, tartaric acid, and a mixture thereof;

c) 0.018–1.8 mmol of an alkali metal salt;

d) 0.0018–0.36 mmol of a calcium or magnesium salt of an organic carboxylic acid, or a mixture thereof; and e) trace elements and vitamins.

17. A water treatment composition for the long term improvement of the water quality of biological maintenance systems, comprising the following, based on the concentration in the maintenance system:

a) 0.5–50 mg of at least one easily or sparingly soluble $Al^{3+}$, $Fe^{3+}$, $TiO^{2+}$ or $ZrO^{2+}$ salt of an organic carboxylic acid;

b) 0.5–100 mg of one or more organic compounds selected from citric acid, saccharose, tartaric acid, and a mixture thereof;

c) 0.018–1.8 mmol of an alkali metal salt;

d) 0.0018–0.36 mmol of a magnesium salt of an organic carboxylic acid, or a mixture thereof; and f) trace elements and vitamins.

* * * * *